United States Patent
Bland et al.

[19]

[11] Patent Number: 5,843,381

[45] Date of Patent: Dec. 1, 1998

[54] APPARATUS FOR REMOVAL OF HYDROGEN SULFIDE

[75] Inventors: William D. Bland, Pittsburgh; James P. Markowitz, Bridgeville, both of Pa.

[73] Assignee: Calgon Carbon Corporation, Pittsburgh, Pa.

[21] Appl. No.: 631,070

[22] Filed: Apr. 12, 1996

[51] Int. Cl.⁶ .................................. B01J 8/06; B01J 8/02
[52] U.S. Cl. ...................... 422/197; 422/171; 422/177; 422/181; 422/188; 422/218; 96/133
[58] Field of Search ..................................... 422/168–171, 422/177–178, 181, 188, 190, 192, 193, 196, 197, 218; 423/522, 523, 224, 230; 95/136; 96/133

[56] References Cited

U.S. PATENT DOCUMENTS 3,847,574  11/1974  Fish ............................................ 96/133
3,969,095   7/1976  Kurahashi ................................. 96/133
5,071,035  12/1991  Kiplinger ................................. 141/330
5,494,869   2/1996  Hayden et al. ............................ 502/22

*Primary Examiner*—Hien Tran
*Attorney, Agent, or Firm*—Titus & McConomy LLP

[57] ABSTRACT

An apparatus and process is provided for the removal of hydrogen sulfide from gases and for restoration of hydrogen sulfide removal capacity in nitrogen-treated carbonaceous chars which have become exhausted for hydrogen sulfide capacity when used for the removal of hydrogen sulfide from gas streams. The apparatus has a matrix of removable canisters which contain the nitrogen-treated carbonaceous chars. This process entails directing the gas containing hydrogen sulfide through the canister, washing the spent carbonaceous char with water by flushing/dynamic washing through the canister to remove the majority of the hydrogen sulfide reaction products. By the use of this process a significant proportion of the original hydrogen sulfide capacity of the nitrogen-treated carbonaceous char is recovered and the canisters can be recycled a large number of times.

7 Claims, 9 Drawing Sheets

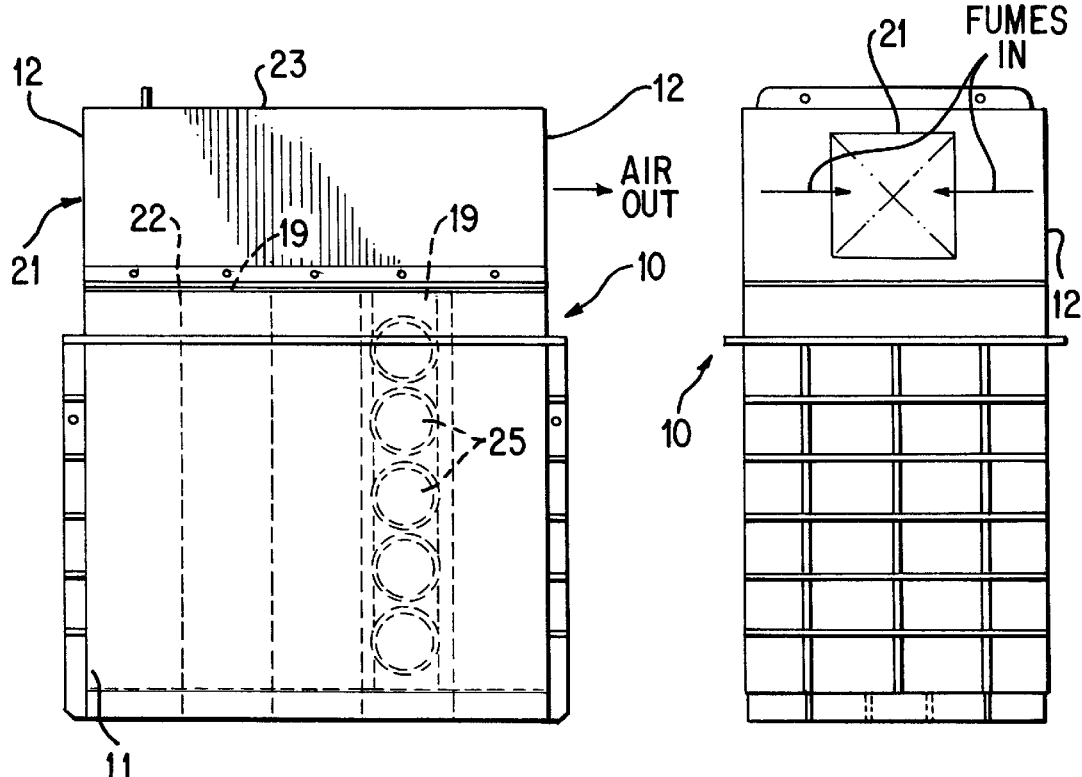
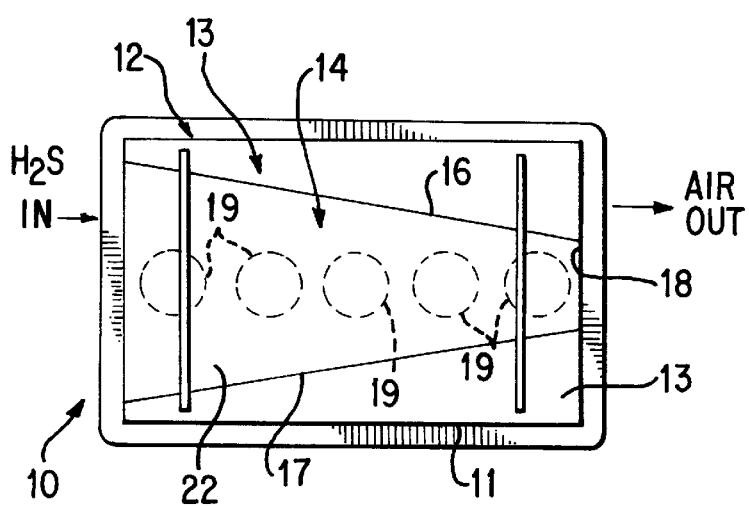
FIG. 1  FIG. 2
FIG. 3

APPARATUS FOR REMOVAL OF HYDROGEN SULFIDE

FIELD OF THE INVENTION

The present invention relates to an apparatus and method for removing hydrogen sulfide in the 0.1 to 100 ppm range using nitrogen-treated carbons and in particular to a means for removing hydrogen sulfide which is smaller and more efficient than conventional scrubbers and odor control units.

BACKGROUND OF THE INVENTION

Various methods means are known for removing hydrogen sulfide. Typically in the control of odor in municipal waste water treatment facilities, high levels of hydrogen sulfide, e.g. up to 100 ppm or greater are experienced. Removal is generally through the use of wet scrubbing using sodium hydroxide and/or sodium hypochlorite in the waste water stream. In addition the use of activated carbon beds to clean or polish the off-gases to remove odor, especially hydrogen sulfide, are extremely large and utilize valuable space at the treatment facility.

Prior art teaches that conventional activated carbons and activated carbons impregnated with salts such as caustic soda or caustic potash remove hydrogen sulfide from gas streams containing oxygen and water by oxidation of the hydrogen sulfide to elemental sulfur, i.e., $$2H_2S + O_2 \rightarrow 2S + 2H_2O \qquad (1).$$

Small amounts of sulfuric acid have also been observed as a reaction product in certain cases; however, this phenomenon is considered to be a minor and unwanted side reaction the origins of which have been generally attributed to the presence of iron or other ash impurities. The elemental sulfur created by reaction (1) deposits in the pore structure of the carbon until the operative moiety responsible for the catalysis is occluded.

Methods for regenerating conventional activated carbons deactivated in this manner have relied upon solvents or upon thermal treatments to remove the accumulated elemental sulfur. The solvents used in such methods are invariably hazardous, expensive, or inconvenient to use. Carbon disulfide, the solvent of choice in many applications, is highly volatile and flammable as well as expensive and highly toxic. Water, the cheapest, safest, and most convenient solvent, cannot be used for regeneration since elemental sulfur is insoluble in water.

Thermal techniques may also be used to restore hydrogen sulfide capacity in conventional carbons deactivated by exposure to hydrogen sulfide. Elemental sulfur sublimes at temperatures above 445° C. and may, therefore, be removed from the carbon surface by direct heating or by hot gases such as nitrogen or steam. Where steam or other oxidizing or reducing agents are present, various other sulfur compounds will also be produced. Since such treatments generate significant quantities of sulfurous vapors, post-treatment facilities such as acid scrubbers or Claus plants are generally required. Additionally, such treatments are energy intensive and require materials of construction which must withstand both high temperatures and corrosive gases. As a result, the utility of thermal treatment methods is limited.

The caustic-impregnated carbons are usually regenerated by contact with concentrated caustic solutions in which elemental sulfur is highly soluble. Since concentrated solutions of sodium or potassium hydroxide are corrosive and toxic, these methods are also hazardous, expensive, and inconvenient to use. Thermal treatment methods are generally not a suitable option for caustic-impregnated carbons since the impregnant catalyzes gasification of the carbon structure at high temperatures and creates aerosols which corrode common materials of construction. Where transition metals are used to impregnate the carbons, comparable problems are encountered. Additionally, the use of an oxidizing agent is generally required to restore the functioning of transition metal-impregnated carbon catalyst. Such treatments also create significant amounts of sulfurous off-gases which require extensive post-treatment.

Surprisingly, the nitrogen-treated carbons used in the present invention to have a distinctly different hydrogen sulfide removal chemistry. The nitrogen treatment has been observed to greatly enhance the conversion of hydrogen sulfide, not to elemental sulfur, but to dilute sulfuric acid. The overall reaction may be represented by $$H_2S + 2O_2 \rightarrow H_2SO_4 \qquad (2)$$

Since sulfuric acid is miscible with water, it may be possible to regenerate a spent nitrogen-treated carbon by washing it with water provided reaction (2) does not in any way alter the fundamental nature of the catalyst sites and provided the sulfuric acid produced by the reaction is not so strongly adsorbed by the carbon that it cannot be removed upon contact with water. Any aqueous sulfuric acid removed from the carbon can then be diluted or neutralized for disposal by any well known technique, conveyed for sulfuric acid reclamation, or used directly in other plant processes.

The nature of the catalyst site responsible for reaction (2) is not known. However, comparison of the removal chemistries of a nitrogen-treated carbon to a conventional carbon prepared from the same raw material, and with comparable adsorption properties and comparable levels of ash and iron, indicates that it is the nitrogen treatment which confers the increased activity of reaction (2) to the carbon. Surprisingly, it has been found in the present invention that neither hydrogen sulfide nor sulfuric acid react with the catalysts sites, despite the well-known ability of sulfur compounds to poison conventional catalysts. It has also been found that substantial amounts of the acid are able to be removed from the carbon surface despite the ability of sulfuric acid to be strongly adsorbed by the carbon surface.

Accordingly, it is the object of the present invention to provide an apparatus for the removal of hydrogen sulfide and for regenerating with water a spent nitrogen-treated carbon used for the removal. It is a further object of the invention to provide a treatment unit which is physically small and highly efficient which advantageously uses the chemistry of the nitrogen-treated carbon.

SUMMARY OF THE INVENTION

The present invention provides an apparatus and method for the removal of hydrogen sulfide to levels below 50 ppb and preferably between 10 to 30 ppb. At these levels no noticeable odor is detectable. The apparatus utilizes removable canisters having a nitrogen treated carbonaceous char bed, preferably a bed of a depth of 3 to 4 inches. The nitrogen treated char utilized in the bed provides extremely efficient removal as well as affords economical restoration of hydrogen sulfide removal capacity in the carbonaceous chars which are selective for hydrogen sulfide conversion to sulfuric acid. In a preferred embodiment of the invention the spent carbon is washed with water in either a continuous or batch process until the effluent water is of a pH 1.5 greater than the initial acidity. Typically the pH is 0.8 to 1.2 but pH's of 2.5 have been advantageously used. This water-washing regenerates the hydrogen sulfide removal capacity of the nitrogen-treated carbon. The water-washed carbon may then be dried as desired. Upon re-exposure to hydrogen sulfide, the carbon is again effective for hydrogen sulfide removal. The cycle of exposure and regeneration in this manner may be repeated as many times as desired, or until the recovered hydrogen sulfide capacity provides a level of performance that is not practical.

The apparatus uses a matrix of canisters comprised of a plurality of rows of stacked canisters. The matrix is connected to source of gas containing hydrogen sulfide as to a discharge port. The size of the unit containing the matrix is substantially smaller than prior art scrubber or odor control units using activated carbon. In addition the fans and water used to facilitate the movement of the gas and regeneration fluids is substantially less than conventional odor control units. Other advantages of the present invention will become apparent from a perusal of the following detailed description of a presently preferred embodiment taken in connection with the accompanying drawings.

BRIEF DESCRIPTION OF THE DRAWINGS

FIG. 1 is a front elevation of the odor control unit of the present invention;

FIG. 2 is a side elevation of the odor control unit shown in FIG. 1;

FIG. 3 is a plan view of the unit shown in FIG. 1;

PRESENTLY PREFERRED EMBODIMENT

Figure 4:
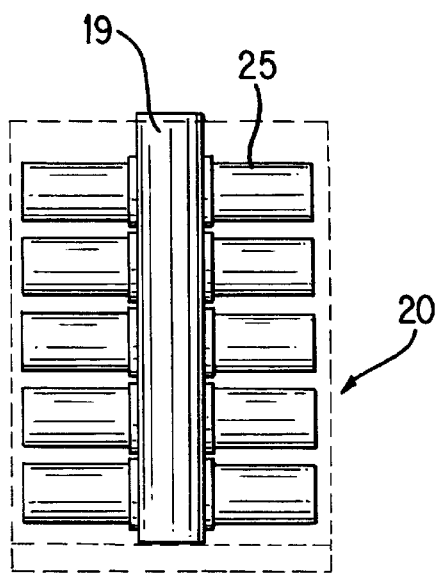
FIG. 4, 5 and 6 are diagrammatic views, front, side and top plan, of the matrix management of the canisters of the present invention.

Referring to FIGS. 1 through 3, the odor control unit 10 of the present invention comprises a housing 11 preferably made of a plastic such as polypropylene or polyethylene. Preferably, positioned on top of housing 11 is a hood unit 12 comprising an outlet channel 13 and an inlet channel 14. As shown more clearly in FIG. 3, inlet channel 14 provide converging walls 16 and 17 and an end wall 18. Inlet channel 14 is in communication with a plurality of standpipes 19 and inlet port 21 is connected to a source of fumes or off gases driven to hood or control unit 10 by means of blower (not shown) having a capacity of 10000 cfm, for example, for use in municipal waste treatment system. A base plate 22 and top member 23 completes the sealing of channel 14.

Figure 5:
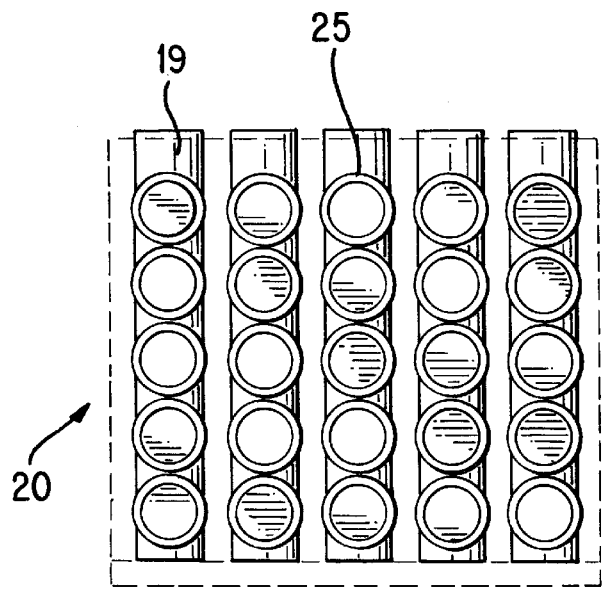
Figure 6:
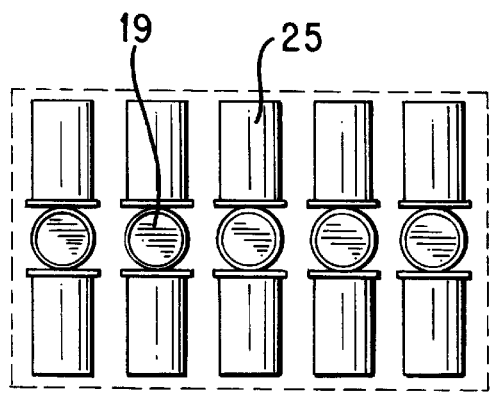

Outlet channel 13 utilizes converging walls 16 and 17 to define an outlet passageway from a plurality of canisters 25 shown more clearly in FIG. 1. Outlet passageway is in communication with the housing 11 containing a plurality of canisters arranged in a matrix as shown in FIGS. 4 through 6. Referring to FIGS. 4 through 6, canisters 25 are arranged in plurality of rows equal in number to the number of stand pipes 19 arranged along the length of housing 11. As shown in FIG. 4, each stand pipe 19 has connected thereto five canisters on each side of the stand pipe. However, the exact number of canisters or standpipes is a matter of flow dynamics, removal ratios and rates and other parameters known for those skilled in the art for each application. The preferred embodiment, the matrix shown in FIGS. 4–6 is useful for almost all municipal waste odor control applications. As shown in FIGS. 5 and 6, each canister 25 is demountably attached as described hereinafter.

Figure 7:
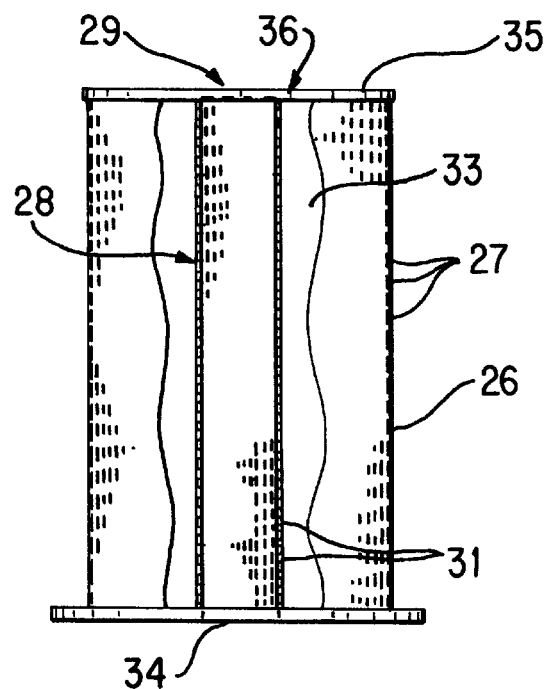
FIG. 7 is a side elevation of a canister of the present invention.
Figure 8:
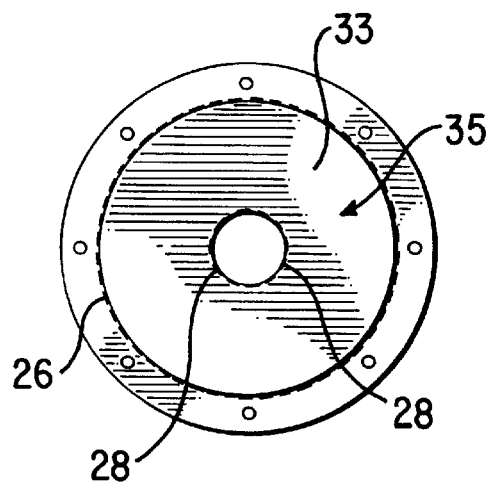
FIG. 8 is a sectional elevation of the canister shown in FIG. 7.
Figure 9:
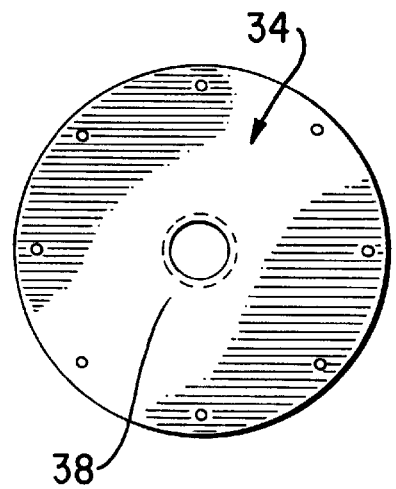
FIG. 9 is an end cap for the canister shown in FIG. 7.

Referring to FIGS. 7 through 9, each canister 25 preferably comprises a cylindrical envelope 26 having a plurality of perforations 27 for the passage of gas. In the presently preferred embodiment, envelope 26 comprises a flexible porous plastic matting made of 300 micron polyethylene particles which is heat pressure molded. An inner conduit 28 which includes inlet port 29 is connected to stand pipe 19 through pipe connector 36 for access to off gases containing hydrogen sulfide. Inner conduit 28 is preferably provided with gas inlet perforations 31 to permit gas to penetrate into the annulus 33 defined by envelope 26 and inner conduit 28. Inner conduit 28 is also preferably made from the same material as envelope 26. Annulus 33 preferably has a depth of 3 to 4 inches and most preferably 4 inches for containing the carbonaceous char. End caps 34 and 35 seal annulus 33. End caps 34 is removable to permit the filling and emptying of the nitrogen-treated carbonaceous char. A canister removal tool (not shown) is to be used by insertion through inner conduit 28 to support canister 25 during attachment to stand pipe 19 through opening 37. Cylindrical envelope 26 and inner conduit 28 are preferably made from polyethylene. End caps 34 and 35 are also made from a plastic material such as polypropylene or polyethylene but can be made from other materials resistant to sulfuric acid. In the preferred embodiment, canister 25 has a length of 20 inches and an outer diameter of 11 inches and 3 inches inner diameter to provide a bed depth of 4". Each canister 25 is designed to accommodate approximately 30 pounds of carbonaceous char.

The nitrogen treated carbonaceous char used in canister 25 of the invention is prepared using a bituminous coal or materials having bituminous properties. The bituminous coal is pulverized, mixed with about 4 to 6% coal tar pitch, and briquetted. The resultant briquettes are crushed and sized to produce a mesh of 8×30 or 8×40 and preferably greater than 12×40 mesh (U.S. Standard Series sieves) material. In the presence of large quantities of excess air, this material is carbonized and oxidized at temperatures between about 250° C. and 450° C. for at least 3 hours. The resultant oxidized char is cooled to near ambient temperatures and subsequently impregnated with an aqueous urea solution or other nitrogen containing compound having at least one nitrogen-containing functionability in which the nitrogen exhibits a formal oxidation number less than that of elemental nitrogen and dried. The quantity of urea solution used was sufficient to produce a 2–4% urea loading on a dry weight basis. The impregnated, oxidized char is then heated to about 950° C. in a furnace and maintained at that temperature for up to 1 hour. Immediately following this treatment the material is contacted with steam, while maintaining a 950° C. temperature, for a period of time sufficient to achieve an Apparent Density (Test Method TM-7, Calgon Carbon Corporation, Pittsburgh, Penn.) of about 0.51 grams per cc for a 6×16 mesh (U.S. Standard Series sieves) particle size distribution. After gasification, the material is cooled to ambient temperature under an inert atmosphere. The nitrogen-treated carbon produced by this procedure is comparable in Apparent Density, adsorption properties, ash content, and iron content to BPL Carbon, a commercial unimpregnated vapor-phase activated carbon manufactured from the same feedstock. See U.S. Pat. No. 5,494,869 incorporated herein by reference.

Figure 6A:
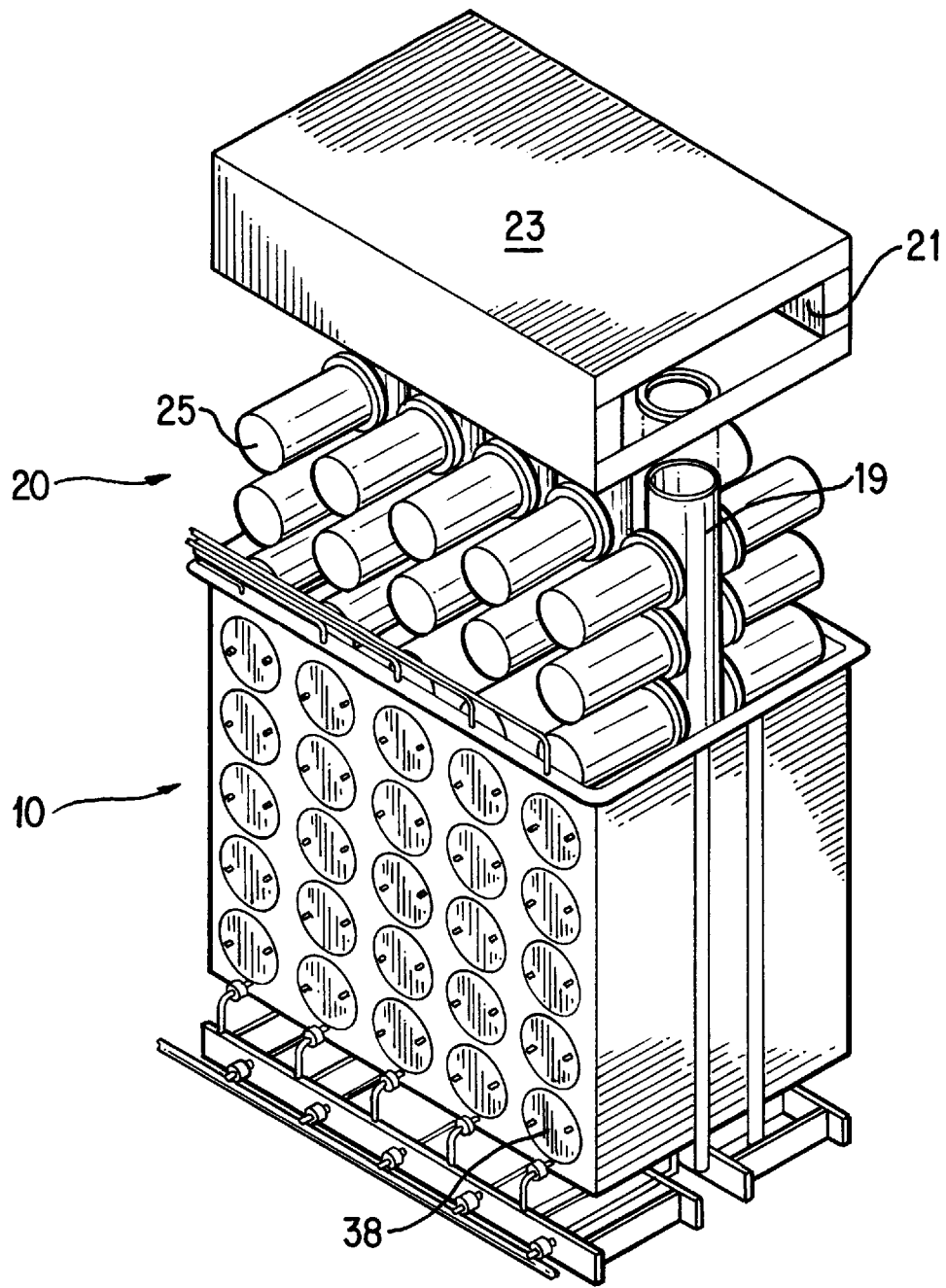
FIG. 6a is a perspective illustration view of the matrix of canisters and standpipes.
Figure 10:
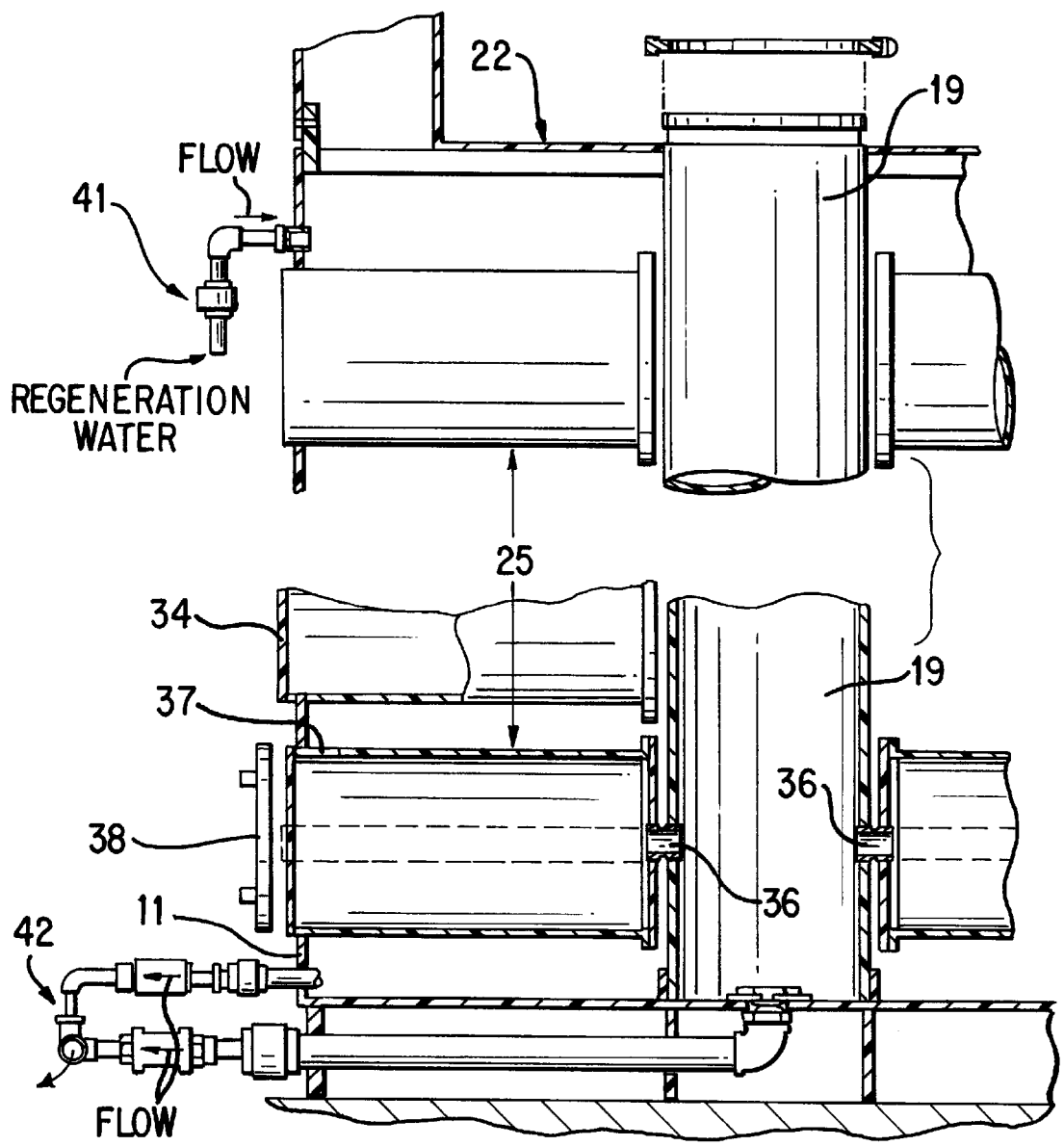
FIG. 10 is a partial sectional elevation showing the canister shown in FIG. 7 mounted in control unit shown in FIGS. 1–3.
Figure 11:
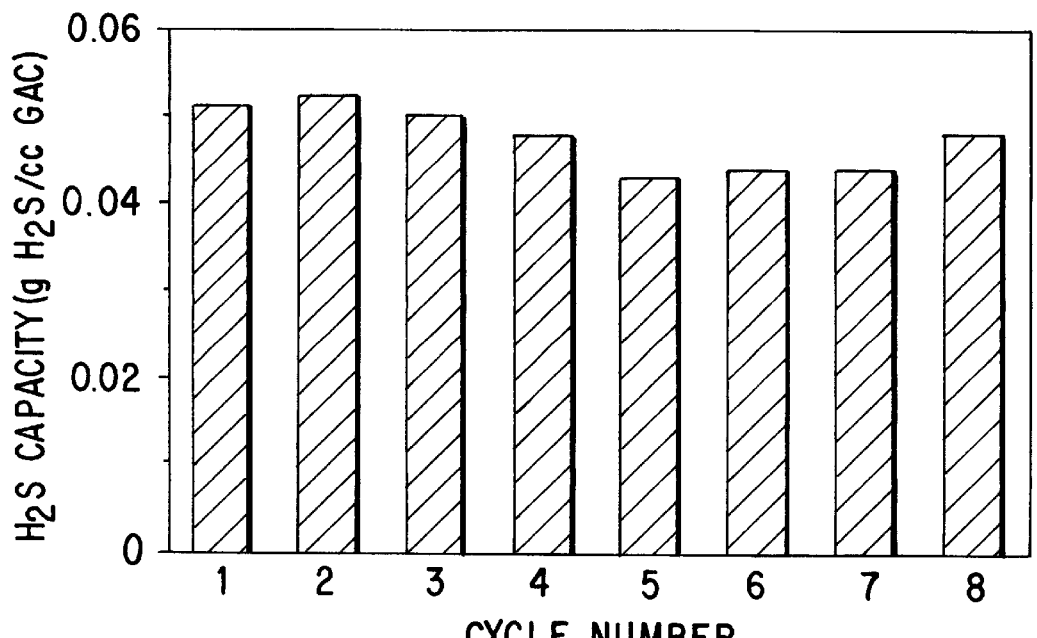
FIGS. 11–18 are graphical presentations of the test results of housing the removal and restoration advantages of the inventor.
Figure 12:
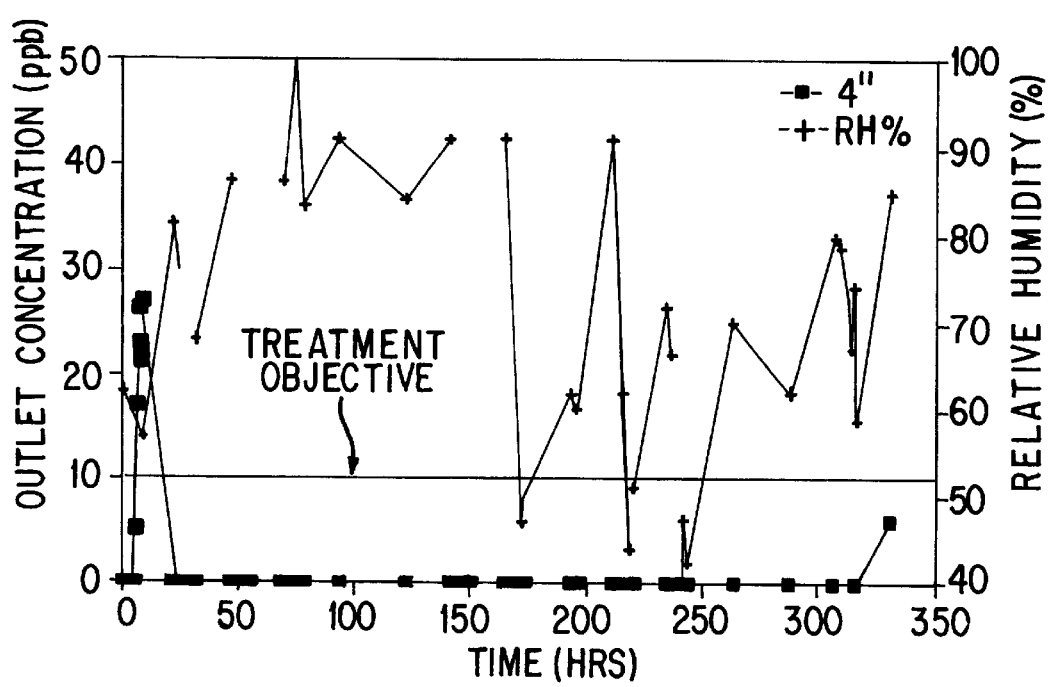
Figure 13:
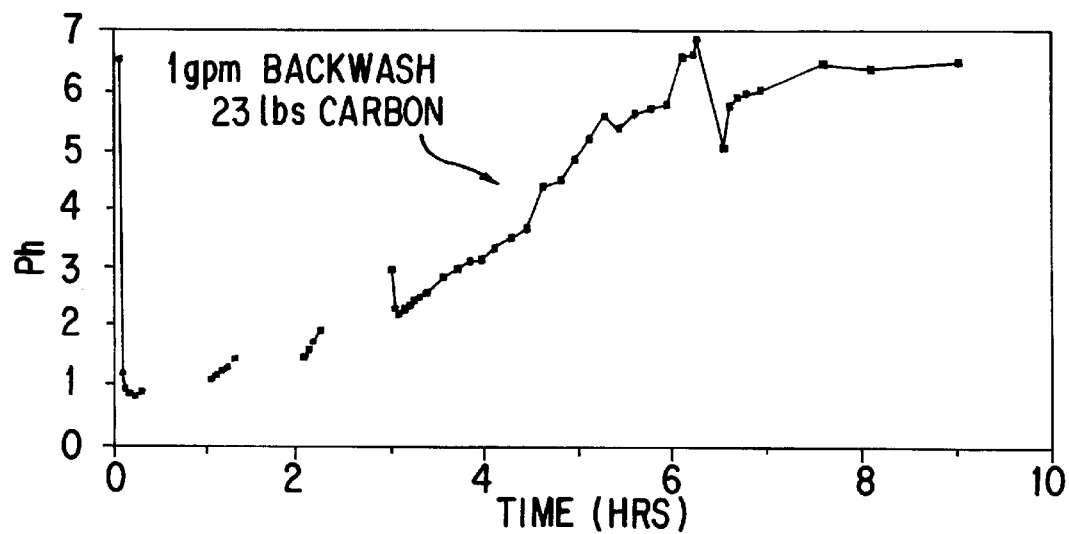
Figure 14:
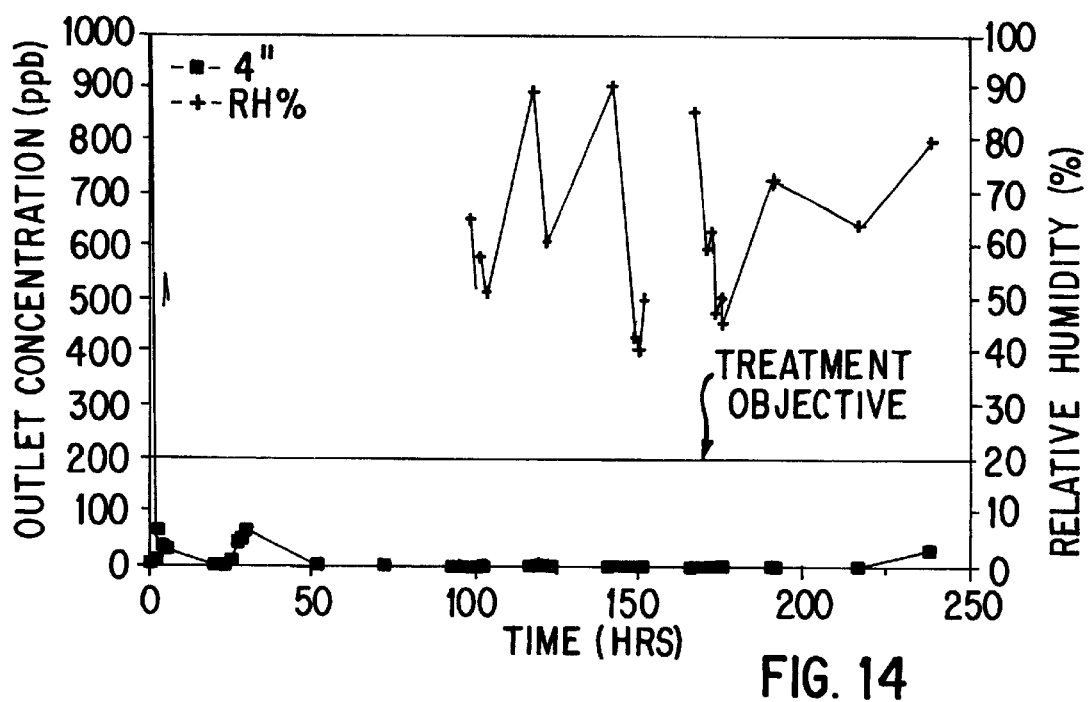
Figure 15:
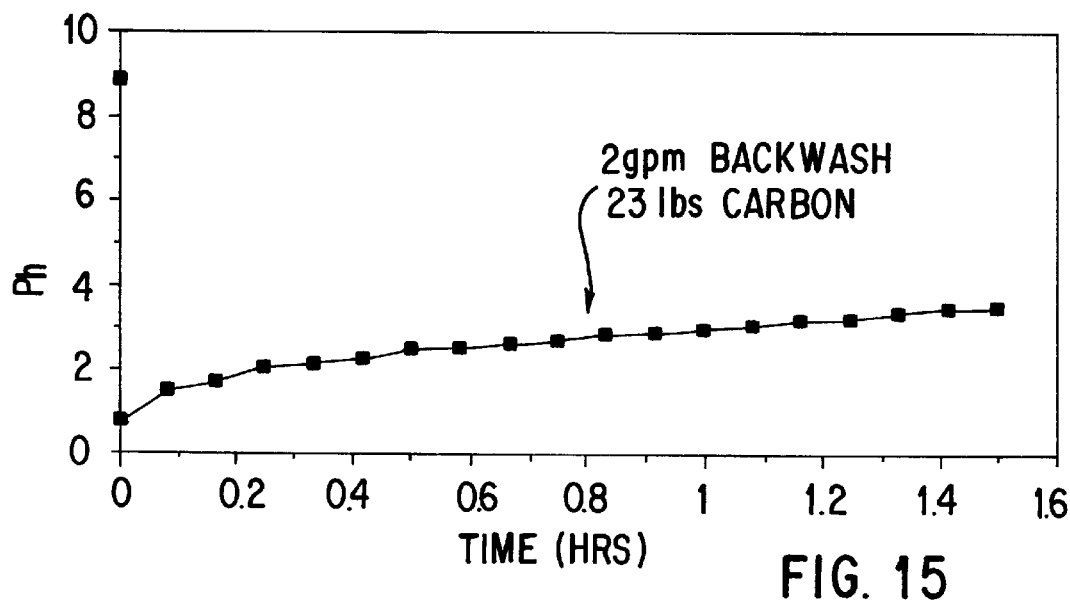
Figure 16:
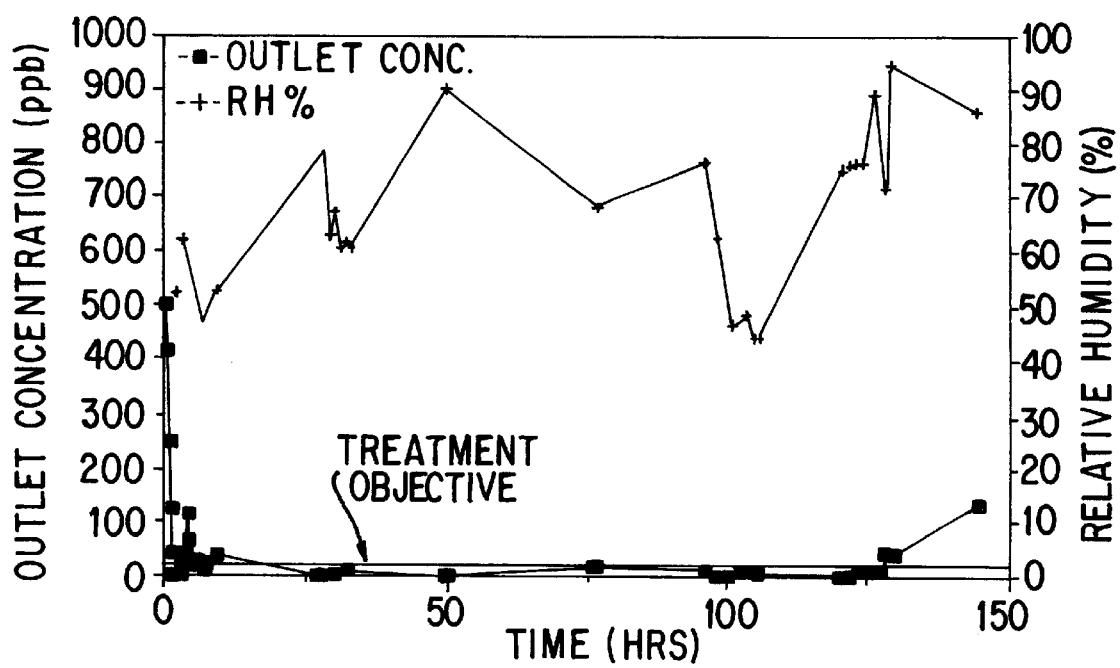
Figure 17:
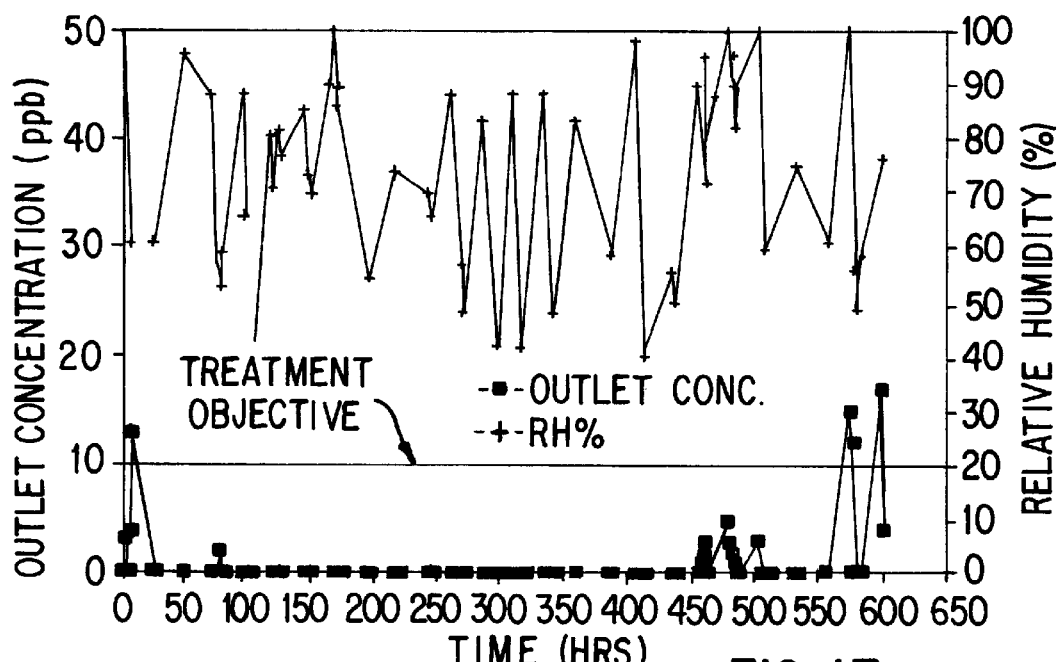
Figure 18:
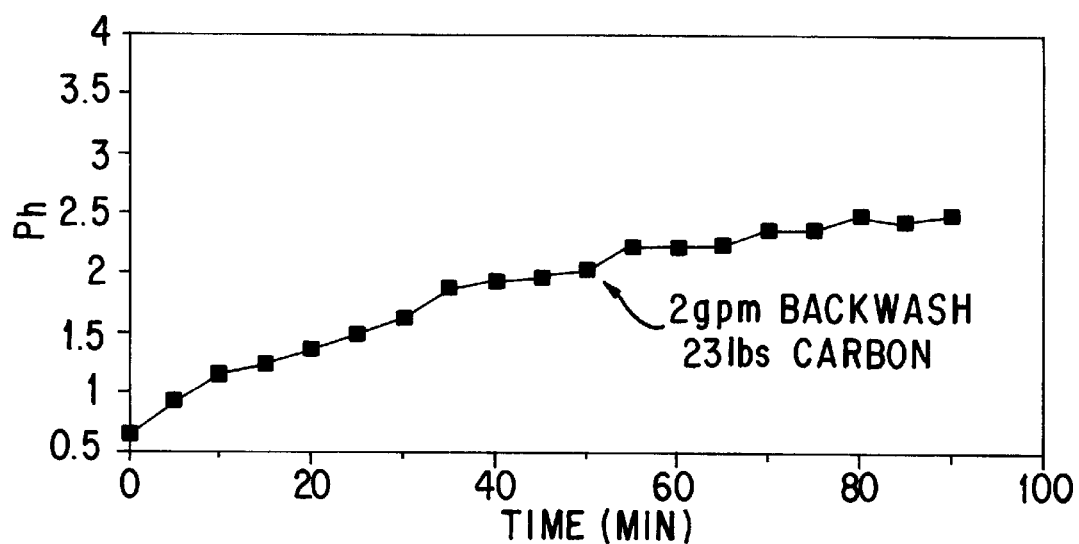

As shown in FIG. 10 each canister 25 is mounted to an associated stand pipe 19 by means of conduit 36. Each canister 29 is preferably mounted through, and associated opening 37 in housing 11. The side wall closure 38 (FIG. 6a and 10) is installed to ensure canister 25 is held within control unit 10. In the preferred method, rows of canisters can be exchanged on a scheduled basis after the carbon has been recycled to its limit. Preferred canister 25 are individually removed by detachment of sidewall closure 38 and withdrawal through opening 37, or removed as groups from the control unit 10 matrix of standpipes 19 and hood unit 12. Water inlets 41 provide a source of regeneration water for cleaning rows of canisters. Water ($H_2SO_4$) is discharged through outlets 42.

Tests using a "centaur" carbon prepared as described above were conducted to determine the $H_2S$ removal levels and useful regeneration cycles of the invention. These tests used an airflow of 10,000 cfm with an inflow $H_2S$ of 10 ppm at ambient temperatures. $H_2S$ breakthrough was set at 1.0 ppm. FIGS. 11 through 18 show the results of the test. In general, it was found that a 8×16 mesh carbon with a four inch bed depth contains a wave front at 150 fpm. Regeneration using water at a countercurrent flow of about 2–3 gpm/ft$^3$.

The process of the present invention effectively uses the radial flow canister in parallel flow patterns to remove $H_2S$ laden fumes preferably pass through each canister 25 at a rate of 150 feet per minute. Removal of the $H_2S$ is by adsorption into the carbon pores and catalytically converting it to $H_2SO_4$. The adsorption/reaction step is followed by a dynamic water washing at 2 g/m or greater through each selected canister. The process advantageously permits recycling individual or groups of canisters by washing only a portion of the matrix moreover, by sequencing the recycle in a continuous manner, the carbon life can be generally extended.

While a presently preferred embodiment of the invention has been described in particularity, it may be otherwise embodied within the scope of the appended claims.

What is claimed is:

1. Apparatus for the removal of hydrogen sulfide comprising:
   (a) a housing having an interior space and a fluid inlet and outlet;
   (b) a plurality of fluid conduits positioned within said housing each in communication with said fluid inlet;
   (c) a plurality of canisters arranged in a matrix of rows each of said rows being associated with at least one fluid conduit, each of said canisters comprising:
      (i) an envelope having an inlet port and outlet ports, each inlet port being in communication with at least one fluid conduit and said outlet ports being in communication with said housing interior space, said envelope and outlet ports being comprised of a flexible porous molded particulate plastic material whereby fluid may pass therethrough;
      (ii) a nitrogen-treated carbonaceous char positioned in said canister between said inlet and outlet ports of said canister.

2. Apparatus as set forth in claim 1 wherein said housing is made of a plastic material resistant to sulfuric acid.

3. Apparatus as set forth in claim 1 wherein said housing includes a hood, said hood having a first portion in communication with said housing inlet and each of said fluid conduits and a second portion in communication with said housing interior space and said outlet.

4. Apparatus as set forth in claim 2 or 3 wherein said fluid conduits comprise standpipes.

5. Apparatus as set forth in claim 3 wherein each envelope is a cylindrical envelope having ends and an inner conduit spaced apart from said envelope to define substantially an annular space therebetween and an end wall at the respective ends of said envelope to define a chamber, said envelope and inner conduit providing communication therethrough to said chamber and said nitrogen-treated carbonaceous char being positioned therein, and said inner conduit being in communication through said end wall with at least one fluid conduit and said envelope being in communication with the interior space of said housing through said outlet ports.

6. Apparatus as set forth in claim 5 wherein said inner conduit is made from a plastic material resistant to sulfuric acid.

7. Apparatus as set forth in claim 6 wherein said inner conduit is made from a flexible porous molded particulate plastic.

* * * * *